US006802569B1

United States Patent
Conard et al.

(10) Patent No.: US 6,802,569 B1
(45) Date of Patent: Oct. 12, 2004

(54) VALVE STEM EXTENDER AND APPARATUS FOR MOUNTING SAME

(76) Inventors: Thomas Conard, 56465 Joan Ave., Mishawaka, IN (US) 46545; Beverly Ann Conard, 56465 Joan Ave., Mishawaka, IN (US) 46545

( * ) Notice: Subject to any disclaimer, the term of this patent is extended or adjusted under 35 U.S.C. 154(b) by 0 days.

(21) Appl. No.: 10/367,182

(22) Filed: Feb. 13, 2003

Related U.S. Application Data

(60) Provisional application No. 60/356,092, filed on Feb. 13, 2002.

(51) Int. Cl.$^7$ ............................................. B60C 29/00
(52) U.S. Cl. ........................ 301/5.24; 152/DIG. 13; 248/65; 224/42.12
(58) Field of Search .................. 301/5.24; 152/427, 152/429, 430, DIG. 13; 224/42.12, 42.28; 248/65

(56) References Cited

U.S. PATENT DOCUMENTS

| | | | |
|---|---|---|---|
| 2,580,343 A | * 12/1951 | Benoit | ..................... 152/427 |
| 2,631,065 A | * 3/1953 | Borodie | ..................... 301/5.24 |
| 3,931,998 A | * 1/1976 | Carson | ..................... 301/5.24 |
| 4,256,160 A | 3/1981 | More | |
| 4,724,880 A | 2/1988 | Voornas | |
| 5,094,374 A | * 3/1992 | Lee | ..................... 224/42.21 |
| 5,121,780 A | 6/1992 | Goodman | |

\* cited by examiner

Primary Examiner—Russell D. Stormer
(74) Attorney, Agent, or Firm—Matthew J. Peirce

(57) ABSTRACT

An apparatus for use with mounted spare tires is disclosed. The apparatus comprises a valve stem extender and a bracket for holding the valve stem extender in place. The bracket can be designed in one of two different embodiments, depending on the desired use. The present invention would be useful to allow a user to inflate a spare tire or check the air pressure of a spare tire when the spare tire would be difficult to reach, especially on trucks, minivans, and sport utility vehicles, where many times the spare tire is mounted underneath or in a container that is difficult to open.

1 Claim, 2 Drawing Sheets

VALVE STEM EXTENDER AND APPARATUS FOR MOUNTING SAME

This application claims benefit of 60/356,092 filed Feb. 13, 2002.

I. BACKGROUND OF THE INVENTION

The present invention concerns that of a new and improved apparatus for use with mounted spare tires.

II. DESCRIPTION OF THE PRIOR ART

U.S. Pat. No. 5,121,780, issued to Goodman, discloses a flexible extension valve for filling an inaccessible spare tire.

U.S. Pat. No. 4,724,880, issued to Voornas, discloses an extension tube attached to a valve stem and includes a pressure gauge for monitoring a spare tire.

U.S. Pat. No. 4,256,160, issued to More, discloses a flexible air hose capable of being attached to a valve stem to check and replenish inaccessibly located spare tires.

III. SUMMARY OF THE INVENTION

The present invention is that of a new and improved apparatus for use with mounted spare tires. The apparatus comprises a valve stem extender and a bracket for holding the valve stem extender in place. The bracket can be designed in one of two different embodiments, depending on the desired use. The present invention would be useful to allow a user to inflate a spare tire or check the air pressure of a spare tire when the spare tire would be difficult to reach, especially on trucks, minivans, and sport utility vehicles, where many times the spare tire is mounted underneath or in a container that is difficult to open.

There has thus been outlined, rather broadly, the more important features of an air pressure monitoring system for spare tires that the detailed description thereof that follows may be better understood and in order that the present contribution to the art may be better appreciated. There are, of course, additional features of the air pressure monitoring system for spare tires that will be described hereinafter and which will form the subject matter of the claims appended hereto.

In this respect, before explaining at least one embodiment of the air pressure monitoring system for spare tires in detail, it is to be understood that the air pressure monitoring system for spare tires is not limited in its application to the details of construction and to the arrangements of the components set forth in the following description or illustrated in the drawings. The air pressure monitoring system for spare tires is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present air pressure monitoring system for spare tires. It is important, therefore, that the claims be regarded as including such equivalent constructions insofar as they do not depart from the spirit and scope of the present invention.

It is therefore an object of the present invention to provide an air pressure monitoring system for spare tires which has all of the advantages of the prior art and none of the disadvantages.

It is another object of the present invention to provide an air pressure monitoring system for spare tires which may be easily and efficiently manufactured and marketed.

It is another object of the present invention to provide an air pressure monitoring system for spare tires which is of durable and reliable construction.

It is yet another object of the present invention to provide an air pressure monitoring system for spare tires which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Priority is hereby claimed to application Ser. No. 60/356,092, filed on Feb. 13, 2002.

The present invention comprises a valve stem extender and a bracket for holding the valve stem extender in place. The bracket can be designed in one of two different embodiments, depending on the desired use, with one of the embodiments incorporating an existing spare tire holder 40 already pivotally attached to a vehicle.

Figure 1:
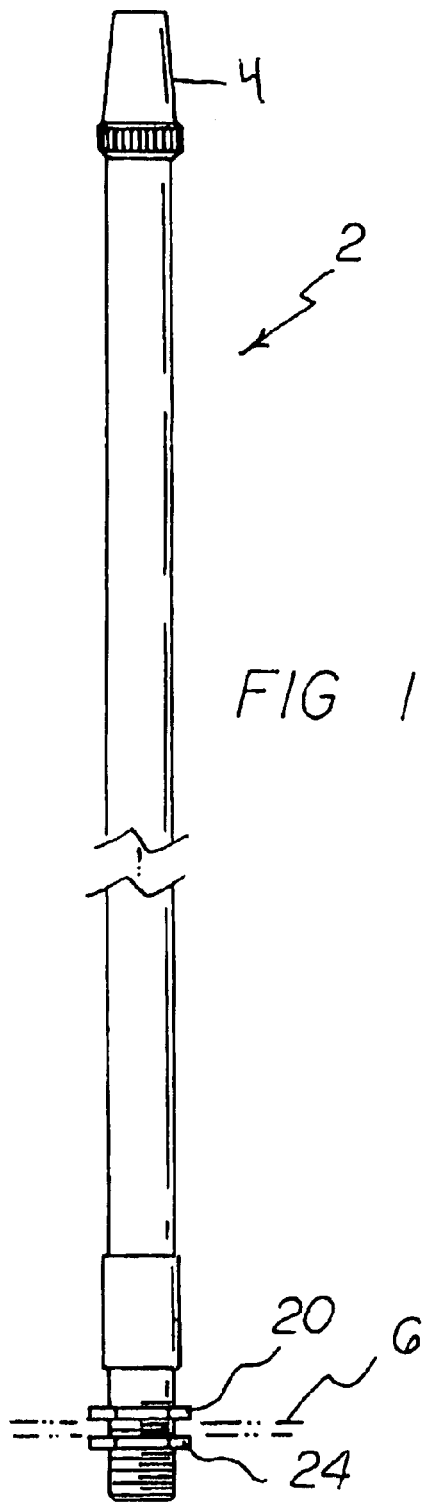
FIG. 1 shows a side view of valve stem extender.

FIG. 1 shows a side view of valve stem extender 2. Extender 2 would have two ends, a first end and a second end, and would be approximately thirty-six inches in length. The first end of extender 2 would have a connector 4 which could be threadably attached to an existing valve stem on a tire or a spare tire. To the second end of extender 2 would be attached a pair of jam nuts 20 and 24, which when combined with bracket 6, would allow the second end of the valve stem extender 2 to be mounted to the particular bracket used for the present invention in each embodiment.

Figure 2:
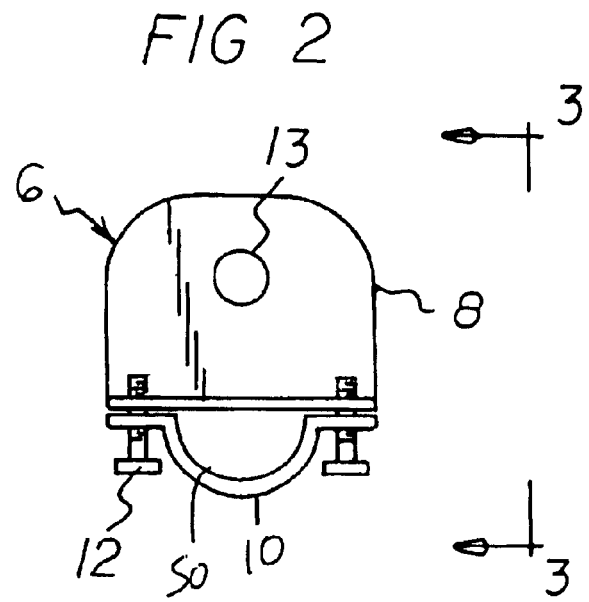
FIG. 2 shows a front view of the spare tire holder bracket.
Figure 3:
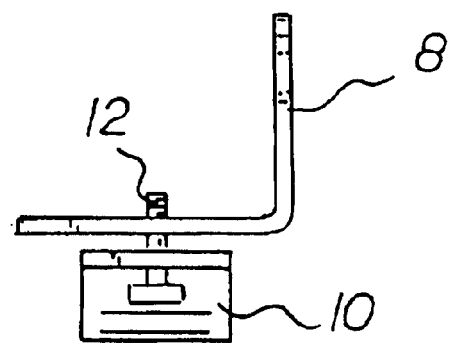
FIG. 3 shows a side view of the spare tire holder bracket.

FIG. 2 shows a front view of the spare tire holder bracket 6, while FIG. 3 shows a side view of the spare tire holder bracket 6. Spare tire bracket 6 comprises an upper section 8 and a lower section 10. Upper section 8 would be L-shaped, while lower section 10 would be designed to have a circular groove 50 in to allow for placement of a bar from a tire holder. Usually, spare tires have a spare tire holder 40 that is pivotally attached to a portion of a vehicle, with the spare tire holder 40 comprising one or more solid bars.

When placing spare tire holder bracket 6 on vehicle, first a user would place the bar from the tire holder within the groove on the lower section 10. Then, a user would place upper section 8 against lower section 10 and use a plurality of screws 12 to removably attach upper section 8 to lower section 10. Upper section 8 would include a centrally located hole 13 through which the second end of valve stem extender 2 could be passed through.

Figure 4:
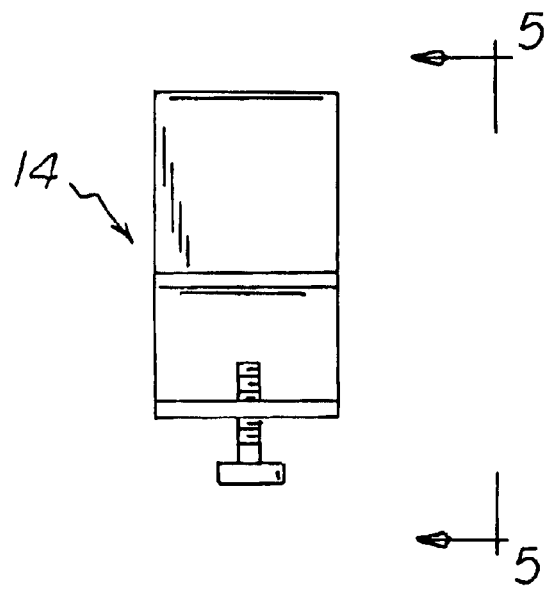
FIG. 4 shows a side view of the bumper bracket.
Figure 5:
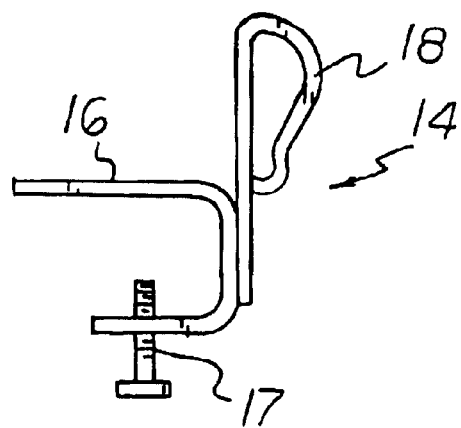
FIG. 5 shows a side view of the bumper bracket.

FIG. 4 shows a front view of the bumper bracket 14, while FIG. 5 shows a side view of the bumper bracket 14. Bumper bracket 14 would be more suited for use with a spare tire that is mounted underneath a vehicle, which is common nowadays with many sport utility vehicles, minivans, and trucks. Bumper bracket 14 would comprise U-shaped section 16 and holder section 18. U-shaped section 16 would be designed to be pushed onto the bumper of a vehicle, with a screw 17 being used to removably attach the bumper bracket 14 onto the bumper.

Holder section 18 would be designed as a metal loop and would be used to hold the second end of valve stem extender 2 when it would not be in use. In addition, a user would be able to test the air pressure within the spare tire or inflate the tire because mounting the second end of the valve stem extender within the holder section 18 would greatly increase accessibility to the spare tire if and when it would be needed.

Figure 6:
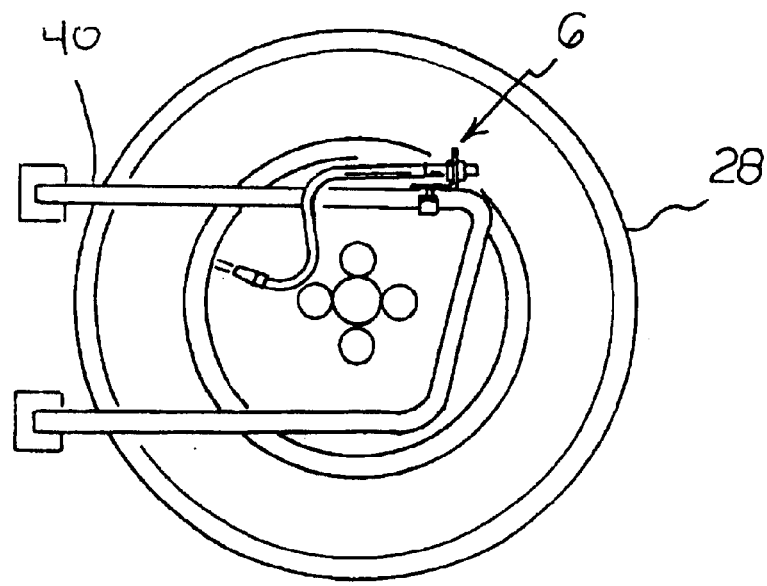
FIG. 6 shows a side view of the spare tire holder bracket as it would appear in use.

FIG. 6 shows a side view of the spare tire holder bracket 6 as it would appear in use with a spare tire 28 and an existing spare tire holder 40. The present invention, with either bracket used, would greatly improve accessibility to the spare tire if and when it would be needed.

What is claimed is:

1. An apparatus for determining existing air pressure within a mounted spare tire within a vehicle in combination with a mounted spare tire on a vehicle and a vehicle, the apparatus comprising:

(a) a valve stem extender having two ends, a first end and a second end, (b) a connector attached to the first end of the valve stem extender, the connector capable of being removably attached to the spare tire, (c) a bracket for holding the second end of the valve stem extender in an upright position, the bracket being mounted on the vehicle, the bracket further comprising (i) an upper section, the upper section being L-shaped, the upper section having an incorporated hole, (ii) a lower section removably attached to the upper section, the lower section having a circular groove, (iii) wherein a portion of the holder bar is placed within the circular groove when the lower section is removably attached to the upper section, and (iv) further wherein the second end of the valve stem extender is inserted through the incorporated hole on the upper section, (d) a holder bar, the holder bar pivotally attached to the vehicle, the holder bar designed to assist in securing the mounted spare tire in a mounted position, (e) means for attaching the second end of the valve stem extender to the bracket, (f) wherein the second end of the valve stem extender is used in combination with an air pressure gauge to determine existing air pressure within the mounted spare tire prior to substituting the mounted spare tire in place of actual tire.

\* \* \* \* \*